H. P. CROUSE.
Buckles for Suspending Brooms and other Articles.
No. 146,878. Patented Jan. 27, 1874.
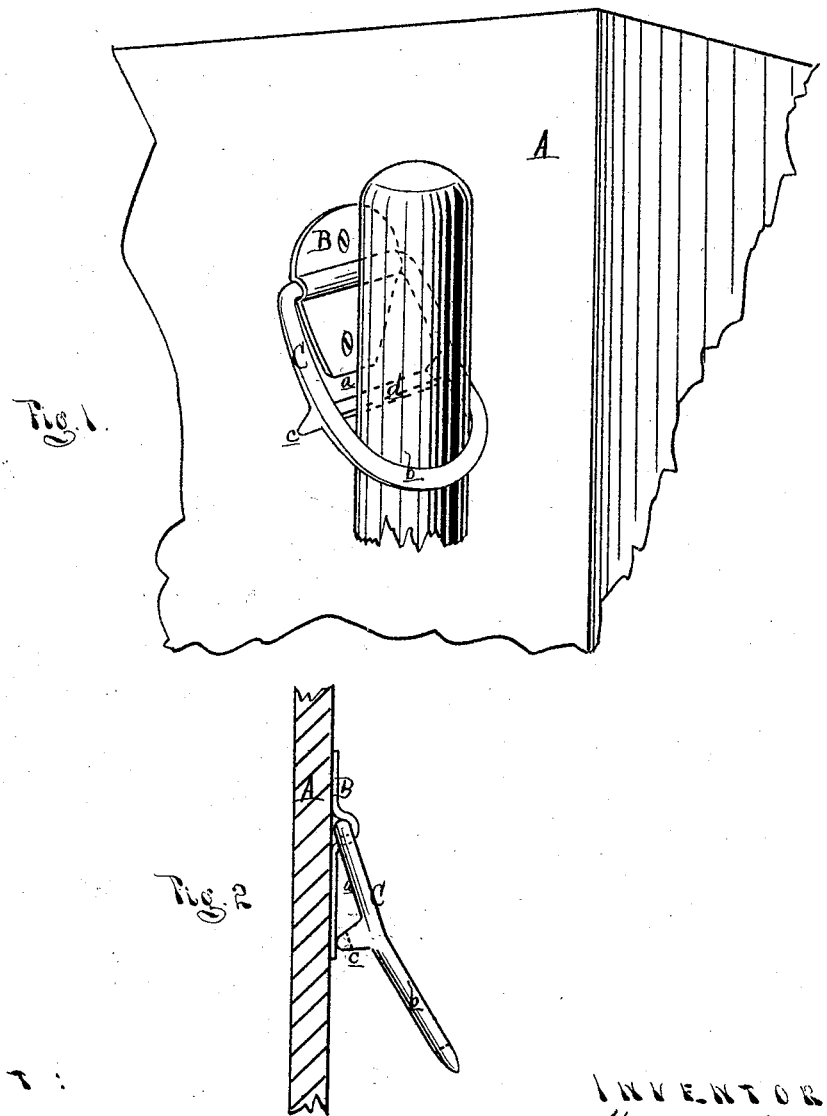
ATTEST:
E. A. Young
Chas. E. Houston
INVENTOR:
Henry P. Crouse
per Attorney
Thos. J. Sprague

UNITED STATES PATENT OFFICE.

HENRY P. CROUSE, OF HARTLAND, MICHIGAN.

IMPROVEMENT IN BUCKLES FOR SUSPENDING BROOMS AND OTHER ARTICLES.

Specification forming part of Letters Patent No. 146,878, dated January 27, 1874; application filed November 8, 1873.

*To all whom it may concern:*

Be it known that I, HENRY P. CROUSE, of Hartland, in the county of Livingston and State of Michigan, have invented an Improvement in Suspending-Buckles, of which the following is a specification:

The nature of this invention relates to an improvement in devices for suspending brooms and other similar articles from the walls, and has for its object to provide a sure and inexpensive device for the purpose specified.

Figure 1 is a perspective view of my device attached to the wall and in operation. Fig. 2 is a side elevation of the same.

Like letters refer to like parts in each figure.

In the accompanying drawings, A represents a section of the wall of a room, upon which is suspended, by means of the strap B, the buckle C, which is constructed with a rectangular part, *a*, which engages with the strap, and a downwardly and outwardly projecting curved bail, *b*, with two rearwardly-projecting studs, *c*, and a bar, *d*, connecting said studs. When not in use this bar rests against the wall, as shown in Fig. 2. When in use, as in Fig. 1, this bar and the bail *b* form the jaws, so to speak, which bind the article suspended against the wall.

I am aware that buckles for harnesses are made somewhat of the form shown. Therefore I do not broadly claim a buckle; but What I do claim as my invention, and desire to secure by Letters Patent, is—

The broom-holder described, consisting of the strap B and the loop C, each constructed, arranged, and operating substantially as described.

HENRY P. CROUSE.

Witnesses:
  THOS. S. SPRAGUE,
  CHAS. J. HUNT.